United States Patent
Thibaud

(10) Patent No.: US 10,016,720 B2
(45) Date of Patent: Jul. 10, 2018

(54) OXYGEN SENSING FOR FUEL TANK INERTING SYSTEM

(71) Applicant: Hamilton Sundstrand Corporation, Windsor Locks, CT (US)

(72) Inventor: Catherine Thibaud, South Windsor, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 249 days.

(21) Appl. No.: 14/799,169

(22) Filed: Jul. 14, 2015

(65) Prior Publication Data

US 2017/0014752 A1    Jan. 19, 2017

(51) Int. Cl.
*B01D 53/22* (2006.01)
*B01D 63/00* (2006.01)
*B64D 37/32* (2006.01)

(52) U.S. Cl.
CPC ............. *B01D 53/22* (2013.01); *B01D 63/00* (2013.01); *B64D 37/32* (2013.01); *B01D 2053/221* (2013.01); *B01D 2256/10* (2013.01); *B01D 2257/104* (2013.01); *B01D 2259/4575* (2013.01); *B01D 2313/90* (2013.01)

(58) Field of Classification Search
CPC .......... B01D 2053/221; B01D 2313/90; B01D 53/22; B01D 63/00; B01D 2257/104; B01D 2259/4575; B01D 2256/10; B64D 37/32
See application file for complete search history.

(56) References Cited

U.S. PATENT DOCUMENTS

| | | | | |
|---|---|---|---|---|
| 4,096,048 A | * | 6/1978 | Matsumoto | G01N 27/4076 204/424 |
| 4,220,516 A | * | 9/1980 | Sano | G01N 27/4075 204/427 |
| 5,160,598 A | * | 11/1992 | Sawada | G01N 27/407 204/429 |
| 5,649,517 A | * | 7/1997 | Poola | B01J 19/088 123/585 |
| 5,767,388 A | * | 6/1998 | Fleischer | G01N 27/12 73/23.31 |
| 5,902,379 A | * | 5/1999 | Phillips | A62B 7/14 95/54 |
| 5,970,780 A | * | 10/1999 | Mori | G01N 27/4075 73/23.31 |

(Continued)

FOREIGN PATENT DOCUMENTS

| EP | EP3118121 A1 | 1/2017 |
|---|---|---|
| WO | 2013004619 A1 | 1/2013 |

OTHER PUBLICATIONS

American Heritage Dictionary "header" May 5, 2014, 2 pages, https://web.archive.org/web/20140505200252/ahdictionary.com/word/search.html?q=header.*

(Continued)

*Primary Examiner* — Anthony Shumate
(74) *Attorney, Agent, or Firm* — Kinney & Lange, P.A.

(57) ABSTRACT

An air separation system includes an air separation module configured to receive feed air and separate the feed air into nitrogen-enriched air and oxygen-enriched air. The air separation module includes an inlet header, an outlet header, and an oxygen sensor located in the outlet header and configured to sense a concentration of oxygen in the nitrogen-enriched air.

11 Claims, 2 Drawing Sheets

(56) References Cited

U.S. PATENT DOCUMENTS

| | | | |
|---|---|---|---|
| 5,972,296 A * | 10/1999 | Hardtl | G01N 27/12 204/291 |
| 5,990,368 A * | 11/1999 | Nakano | C07C 5/23 585/534 |
| 6,071,476 A * | 6/2000 | Young | G01N 27/16 422/51 |
| 7,204,868 B2 | 4/2007 | Snow, Jr. | |
| 7,574,894 B2 | 8/2009 | Austerlitz et al. | |
| 7,625,434 B2 | 12/2009 | Tom et al. | |
| 9,901,874 B2 * | 2/2018 | Rugg | B01D 53/66 |
| 2002/0096174 A1 * | 7/2002 | Hill | A61M 16/10 128/205.11 |
| 2003/0233936 A1 | 12/2003 | Crome | |
| 2004/0025507 A1 * | 2/2004 | Leigh | B64D 37/32 60/608 |
| 2004/0226438 A1 | 11/2004 | Jones | |
| 2005/0115404 A1 * | 6/2005 | Leigh | B01D 53/0454 95/11 |
| 2008/0148935 A1 * | 6/2008 | Givens | B01D 53/047 95/14 |
| 2010/0269698 A1 * | 10/2010 | Yates | B01D 53/228 96/10 |
| 2011/0089110 A1 * | 4/2011 | De Sitter | B01D 61/362 210/640 |
| 2013/0294950 A1 | 11/2013 | Massey | |
| 2014/0331857 A1 | 11/2014 | Massey et al. | |
| 2014/0360373 A1 | 12/2014 | Peacos et al. | |
| 2016/0298648 A1 * | 10/2016 | Graham | F04D 29/0513 |
| 2017/0014774 A1 * | 1/2017 | Daniello | B64D 37/32 |

OTHER PUBLICATIONS

Extended European Search Report, for European PAtent Application No. 16179424.3, dated Dec. 20, 2016, 8 pages.
Communication under Rule 71(3) EPC for EP Application No. 16179424.3, dated Jan. 5, 2018, 20 Pages.

* cited by examiner

OXYGEN SENSING FOR FUEL TANK INERTING SYSTEM

BACKGROUND

This disclosure relates to air separation systems for aircraft, and more specifically to an oxygen sensor for a nitrogen generation system.

Aircraft fuel tanks and containers can contain potentially combustible combinations of oxygen, fuel vapors, and ignition sources. In order to prevent combustion, the ullage of fuel tanks and containers is filled with air with high nitrogen concentration, or nitrogen-enriched air (NEA). A nitrogen generation system (NGS) is commonly used to produce NEA for inerting fuel tanks and containers. An air separation module (ASM) in the NGS separates ambient air into NEA, which is directed to fuel tanks and containers, and oxygen-enriched air (OEA), which is rejected overboard. The ASM typically includes a polymeric membrane for separating ambient air into NEA and OEA.

For a given system, the amount of oxygen in the NEA depends on various parameters such as feed flow and operating pressure. Therefore, an oxygen sensor can be used to ensure that the oxygen concentration in the NEA remains below a prescribed level in order to reduce risk of explosion in fuel tanks and containers. Typically the oxygen sensor is fed by a small slip gas flow from the NEA flowing out of the ASM to the fuel tanks and containers. Once the slip gas flow passes through the oxygen sensor so that the oxygen sensor measures the oxygen concentration in the NEA, the slip gas flow is rejected overboard. Positioning an oxygen sensor in a slip gas flow stream therefore results in a loss of NEA, which could otherwise be used for fuel tank and container inerting. Additionally, the oxygen sensor and slip gas flow take up additional room, which results in the NGS taking up additional space within the aircraft.

SUMMARY

In one embodiment, an air separation system includes an air separation module configured to receive feed air and separate the feed air into nitrogen-enriched air and oxygen-enriched air. The air separation module includes an inlet header, an outlet header, and an oxygen sensor located in the outlet header and configured to sense a concentration of oxygen in the nitrogen-enriched air.

In another embodiment, an air separation system includes an air separation manifold configured to receive feed air and separate the feed air into nitrogen-enriched air and oxygen-enriched air. The air separation manifold includes air separation modules, and each of the air separation modules includes an inlet header, an outlet header, and an oxygen sensor located in the outlet header and configured to sense a concentration of oxygen in the nitrogen-enriched air.

In another embodiment, a method for sensing oxygen concentration in an air separation system includes flowing feed air into an air separation module. The air separation module includes an inlet header, an outlet header, and an oxygen sensor located in the outlet header. The method further includes separating the feed air into nitrogen-enriched air and oxygen-enriched air in the air separation module, flowing the nitrogen-enriched air through the oxygen sensor located in the outlet header of the air separation module, and sensing a concentration of oxygen in the nitrogen-enriched air with the oxygen sensor.

DETAILED DESCRIPTION

The present disclosure relates to an air separation system, specifically a nitrogen generation system (NGS), for generating air with high nitrogen concentration (nitrogen-enriched air). An air separation module (ASM) in the NGS separates feed air into nitrogen-enriched air (NEA) and oxygen-enriched air (OEA). The oxygen concentration in the NEA is measured using an oxygen sensor to ensure that the oxygen concentration in the NEA remains below a prescribed level. The oxygen sensor is located in the outlet header of the ASM, which eliminates the need for a slip gas flow and allows all of the NEA generated by the ASM to be routed to fuel tanks and containers for inerting. Additionally, in an NGS with multiple ASMs, each ASM has an oxygen sensor in the outlet header. This allows for monitoring of each ASM with a corresponding oxygen sensor to determine if and when the membrane of each ASM requires replacement.

Figure 1:
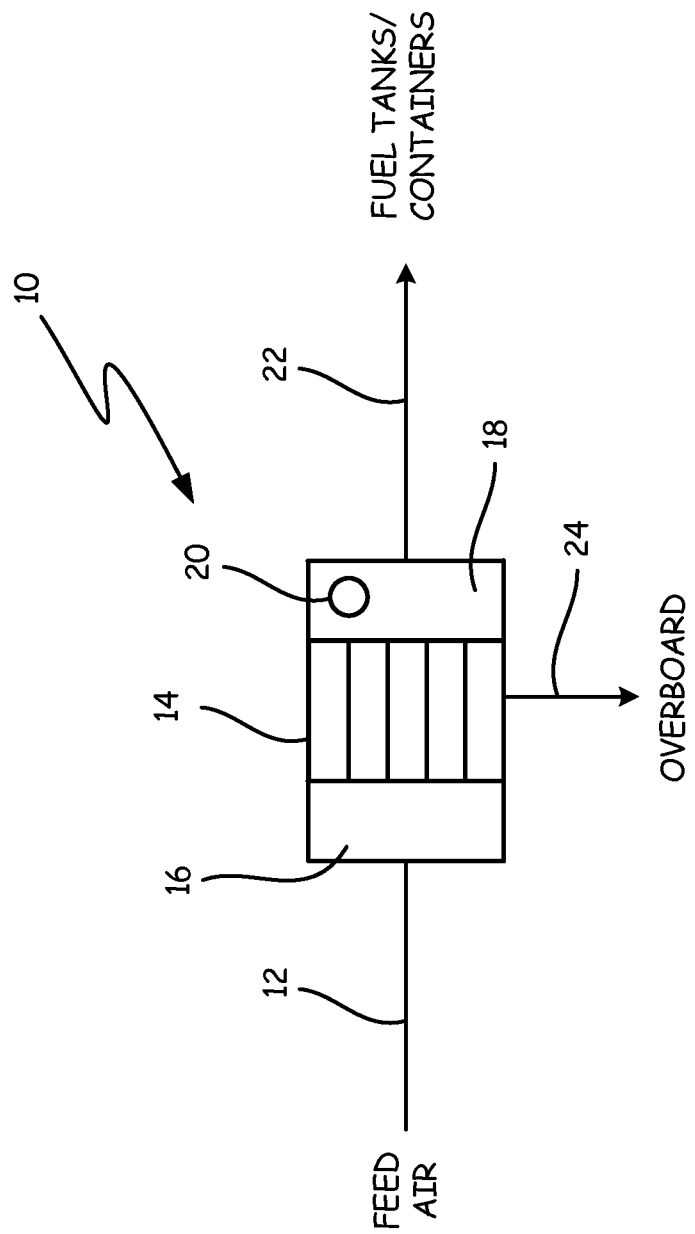
FIG. 1 is a schematic diagram of a nitrogen generation system.

FIG. 1 is a schematic diagram of NGS 10. NGS 10 includes feed air line 12 and ASM 14. ASM 14 includes inlet header 16 and outlet header 18 with oxygen sensor 20. NGS 10 also includes NEA line 22, and OEA line 24. ASM 14 receives feed air through feed air line 12 and separates the feed air into NEA and OEA. The NEA leaves ASM 14 through NEA line 22 and is routed to fuel tanks and containers for inerting. The OEA leaves ASM 14 through OEA line 24 and is typically rejected overboard.

ASM 14 can be a membrane-based ASM with a membrane made of a polymer such as poly(1-trimethylsilyl-1-propyne), Teflon, silicone rubber, poly(4-methyl-1-pentene), poly(phenylene oxide), ethyl cellulose, polyimide, polysulfone, polyaramide, tetrabromo bis polycarbonate, or combinations thereof. When feed air enters ASM 14, the feed air passes through inlet header 16 and enters the membrane of ASM 14. Inlet header 16 is an empty space within ASM 14 where the flow of feed air is distributed prior to entering the membrane of ASM 14. The membrane separates the feed air into NEA and OEA, and the NEA flows through outlet header 18 into NEA line 22. Outlet header 18 is an empty space within ASM 14 where the NEA that is separated in the membrane of ASM 14 is combined prior to distribution to fuel tanks and containers through NEA line 22.

Oxygen sensor 20 is located in outlet header 18. Oxygen sensor 20 can be integral to outlet header 18 and ASM 14. In another embodiment, oxygen sensor 20 can be removable so that oxygen sensor 20 can be replaced without having to remove ASM 14 from NGS 10. Oxygen sensor 20 can be a metal oxide based sensor or any other suitable material for sensing oxygen concentration. Oxygen sensor 20 determines the concentration of oxygen in the NEA leaving ASM 14 through outlet header 18 in order to ensure that the oxygen concentration in the NEA remains below a prescribed level. The oxygen concentration sensed by oxygen sensor 20 can be communicated to a control system. The control system can adjust the flow rate and temperature of feed air flowing through ASM 14 in order to change the oxygen concentration in the NEA to a desired level. For commercial aircraft, the oxygen concentration in the NEA should remain below 12%. For military aircraft, the oxygen concentration in the NEA should remain below 8%.

NGS 10 is advantageous, because oxygen sensor 20 is located in outlet header 18 of ASM 14. This eliminates the need for a slip gas flow from NEA line 22 to an oxygen sensor, and allows all of the NEA generated by ASM 14 to be routed through NEA line 22 to fuel tanks and containers for inerting. Placing oxygen sensor 20 in outlet header 18 also saves space within NGS 10, because it eliminates the need for space for a separate flow line and oxygen sensor outside of ASM 14. This allows NGS 10 to be more compact and take up less space within an aircraft.

Figure 2:
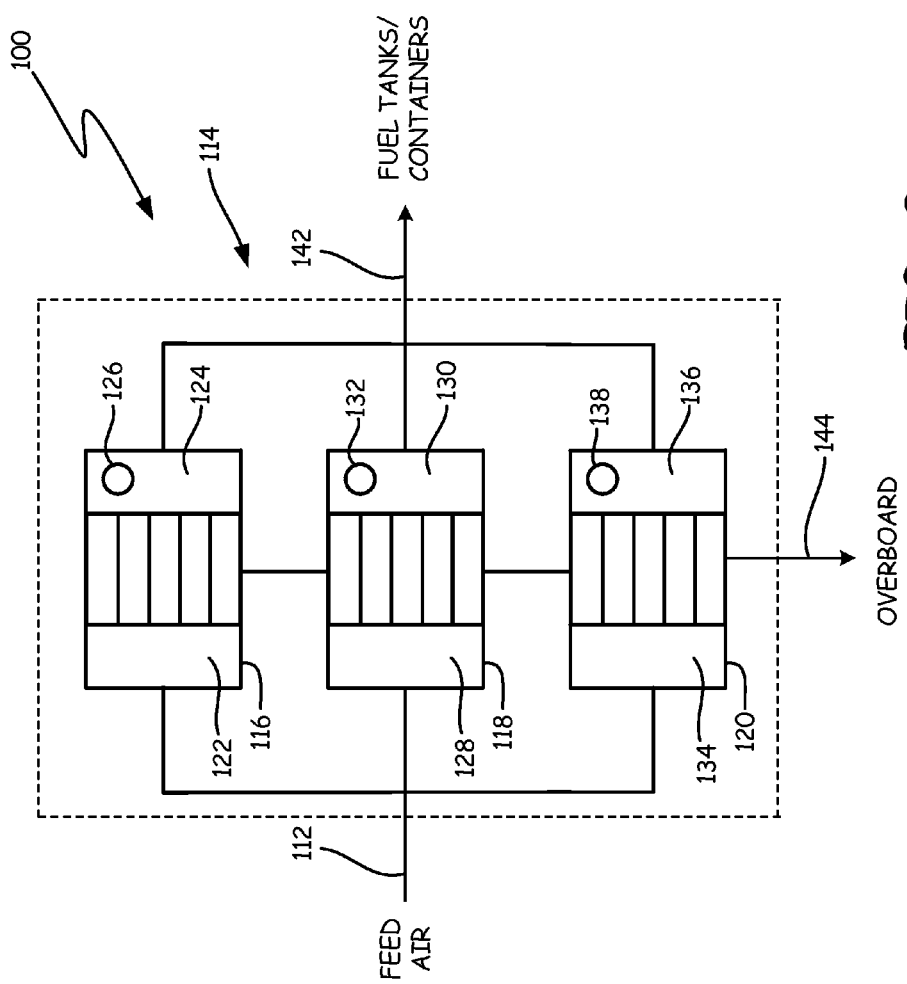
FIG. 2 is a schematic diagram of another embodiment of the nitrogen generation system of FIG. 1.

FIG. 2 is a schematic diagram of NGS 100, another embodiment of NGS 10 of FIG. 1. NGS 100 includes feed air line 112 and air separation manifold 114. Air separation manifold 114 includes ASM 116, ASM 118, and ASM 120. ASM 116 includes inlet header 122 and outlet header 124 with oxygen sensor 126. ASM 118 includes inlet header 128 and outlet header 130 with oxygen sensor 132. ASM 120 includes inlet header 134 and outlet header 136 with oxygen sensor 138.

NGS 100 functions similarly to NGS 10 in FIG. 1, except NGS 100 has air separation manifold 114 with ASMs 116, 118, and 120, instead of ASM 14. ASM manifold 114 receives feed air through feed air line 112 and distributes the feed air to ASMs 116, 118, and 120. ASMs 116, 118 and 120 separate the feed air into NEA and OEA. The NEA leaves ASMs 116, 118, and 120 and is combined within air separation manifold 114. The NEA leaves air separation manifold 114 through NEA line 142 and is routed to fuel tanks and containers for inerting. The OEA is also combined within air separation manifold 114. The OEA leaves air separation manifold 114 through OEA line 144 and is typically rejected overboard.

When feed air enters ASMs 116, 118, and 120, the feed air passes through inlet headers 122, 128, and 134, respectively and enters each of the membranes of ASMs 116, 118, and 120. The membranes of ASMs 116, 118, and 120 separate the feed air into NEA and OEA, and the NEA flows through outlet headers 124, 130, and 136, respectively. The NEA flowing out of outlet headers 124, 130, and 136 is combined within air separation manifold 114 and subsequently flows into NEA line 142.

Oxygen sensors 126, 132, and 138 are located in outlet headers 124, 130, and 136, respectively. Oxygen sensors 126, 132, and 138 determine the concentration of oxygen in the NEA leaving ASMs 116, 118, and 120 through outlet headers 124, 130, and 136, respectively, in order to ensure that the oxygen concentration in the NEA remains below a prescribed level. The oxygen concentration sensed by oxygen sensors 126, 132, and 138 can be communicated to a control system. The control system can adjust the flow rate and temperature of feed air flowing through ASMs 15, 118, and 120 in order to change the oxygen concentration in the NEA to a desired level. NGS 100 is advantageous, because oxygen sensors 126, 132, and 138 are located in outlet headers 124, 130, and 136, respectively. This eliminates the need for a slip gas flow from NEA line 142 to an oxygen sensor, and allows all of the NEA generated in air separation manifold 114 to be routed through NEA line 142 to fuel tanks and containers for inerting. Placing oxygen sensors 126, 132, and 138 in outlet headers 124, 130, and 136, respectively also saves space within NGS 100, allowing NGS 100 to be more compact and take up less space within an aircraft.

NGS 100 is also advantageous, because oxygen sensors 126, 132, and 138 provide monitoring of ASMs 116, 118, and 120 so that a membrane failure can be detected. For example, if the membrane of ASM 116 fails, the concentration of oxygen in the NEA in outlet header 124 sensed by oxygen sensor 126 will be higher than desired. This will indicate that ASM 116 is malfunctioning and the membrane needs to be replaced. Having an individual oxygen sensor for each of ASMs 116, 118, and 120 allows for monitoring of each ASM with a corresponding oxygen sensor to determine if and when the membrane of each ASM requires replacement. This prevents unnecessary replacement of ASM membranes and saves repair costs for NGS 100.

Discussion of Possible Embodiments

The following are non-exclusive descriptions of possible embodiments of the present invention.

An air separation system according to an exemplary embodiment of this disclosure, among other possible things includes an air separation module configured to receive feed air and separate the feed air into nitrogen-enriched air and oxygen-enriched air. The air separation module includes an inlet header, an outlet header, and an oxygen sensor located in the outlet header and configured to sense a concentration of oxygen in the nitrogen-enriched air.

The air separation system of the preceding paragraph can optionally include, additionally and/or alternatively, any one or more of the following features, configurations and/or additional components:

A further embodiment of the foregoing air separation system, wherein the oxygen sensor is integral to the outlet header.

A further embodiment of any of the foregoing air separation systems, wherein the oxygen sensor is removable from the outlet header.

A further embodiment of any of the foregoing air separation systems, wherein the oxygen sensor is a metal oxide based sensor.

A further embodiment of any of the foregoing air separation systems, and further including a nitrogen-enriched air line for transporting the nitrogen-enriched air from the air separation module to a fuel tank of an aircraft for inerting.

A further embodiment of any of the foregoing air separation systems, and further including an oxygen-enriched air line for rejecting the oxygen-enriched air overboard the aircraft.

A further embodiment of any of the foregoing air separation systems, wherein the air separation module further comprises a membrane.

A further embodiment of any of the foregoing air separation systems, wherein the membrane is made of a polymer selected from the group consisting of poly(1-trimethylsilyl-1-propyne), Teflon, silicone rubber, poly(4-methyl-1-pentene), poly(phenylene oxide), ethyl cellulose, polyimide, polysulfone, polyaramide, tetrabromo bis polycarbonate, and combinations thereof.

An air separation system according to an exemplary embodiment of this disclosure, among other possible things includes an air separation manifold configured to receive feed air and separate the feed air into nitrogen-enriched air and oxygen-enriched air. The air separation manifold includes air separation modules, and each of the air separation modules includes an inlet header, an outlet header, and an oxygen sensor located in the outlet header and configured to sense a concentration of oxygen in the nitrogen-enriched air.

The air separation system of the preceding paragraph can optionally include, additionally and/or alternatively, any one or more of the following features, configurations and/or additional components:

A further embodiment of the foregoing air separation system, wherein each of the oxygen sensors is integral to each of the outlet headers of each of the plurality of air separation modules.

A further embodiment of any of the foregoing air separation systems, wherein each of the oxygen sensors of each of the plurality of air separation modules is removable from each of the outlet headers of each of the plurality of air separation modules.

A further embodiment of any of the foregoing air separation systems, wherein each of the oxygen sensors of each of the plurality of air separation modules is a metal oxide based sensor.

A further embodiment of any of the foregoing air separation systems, and further including a nitrogen-enriched air line for transporting the nitrogen-enriched air from the air separation manifold to a fuel tank of an aircraft for inerting.

A further embodiment of any of the foregoing air separation systems, and further including an oxygen-enriched air line for rejecting the oxygen-enriched air overboard the aircraft.

A further embodiment of any of the foregoing air separation systems, wherein each of the air separation modules further comprises a membrane.

A further embodiment of any of the foregoing air separation systems, wherein each of the membranes of each of the air separation modules is made of a polymer selected from the group consisting of poly(1-trimethylsilyl-1-propyne), Teflon, silicone rubber, poly(4-methyl-1-pentene), poly(phenylene oxide), ethyl cellulose, polyimide, polysulfone, polyaramide, tetrabromo bis polycarbonate, and combinations thereof.

A method for sensing oxygen concentration in an air separation system according to an exemplary embodiment of this disclosure, among other possible things includes flowing feed air into an air separation module. The air separation module includes an inlet header, an outlet header, and an oxygen sensor located in the outlet header. The method further includes separating the feed air into nitrogen-enriched air and oxygen-enriched air in the air separation module, flowing the nitrogen-enriched air through the oxygen sensor located in the outlet header of the air separation module, and sensing a concentration of oxygen in the nitrogen-enriched air with the oxygen sensor.

The method of the preceding paragraph can optionally include, additionally and/or alternatively, any one or more of the following features, configurations and/or additional components:

A further embodiment of the foregoing method, and further including transporting the nitrogen-enriched air from the air separation module to a fuel tank of an aircraft for inerting.

A further embodiment of any of the foregoing methods, and further including rejecting the oxygen-enriched air overboard the aircraft.

A further embodiment of any of the foregoing methods, wherein separating the feed air into nitrogen-enriched air and oxygen-enriched air includes flowing the feed air through a membrane of the air separation module.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air separation system comprising:
    an air separation manifold configured to receive feed air and separate the feed air into nitrogen-enriched air and oxygen-enriched air, the air separation manifold comprising:
        a plurality of air separation modules, each individual air separation module of the plurality of air separation modules comprising:
            an inlet header configured to receive the feed air, wherein the inlet header is an empty space located in a first side of the air separation module;
            an air separation membrane configured to receive the feed air from the inlet header, the air separation membrane configured to separate the feed air into the nitrogen-enriched air and the oxygen-enriched air;
            an outlet header configured to receive the nitrogen enriched air from the air separation membrane, wherein the outlet header is an empty space located in a second side of the air separation module opposite the first side of the air separation module; and
            an oxygen sensor located in the outlet header and configured to sense a concentration of oxygen in the nitrogen-enriched air within the outlet header of that individual air separation module.

2. The air separation system of claim 1, wherein each of the oxygen sensors is integral to each of the outlet headers of each of the plurality of air separation modules.

3. The air separation system of claim 1, wherein each of the oxygen sensors of each of the plurality of air separation modules is removable from each of the outlet headers of each of the plurality of air separation modules.

4. The air separation system of claim 1, wherein each of the oxygen sensors of each of the plurality of air separation modules is a metal oxide based oxygen sensor.

5. The air separation system of claim 1, and further comprising a nitrogen-enriched air line for transporting the nitrogen-enriched air from the air separation manifold to a fuel tank of an aircraft for inerting.

6. The air separation system of claim 5, and further comprising an oxygen-enriched air line for rejecting the oxygen-enriched air overboard the aircraft.

7. The air separation system of claim 1, wherein each of the air separation membranes of each of the air separation modules is made of a polymer selected from the group consisting of poly(1-trimethylsilyl-1-propyne), Teflon, silicone rubber, poly(4-methyl-1-pentene), poly(phenylene oxide), ethyl cellulose, polyimide, polysulfone, polyaramide, tetrabromo bis polycarbonate, and combinations thereof.

8. A method for sensing oxygen concentration in an air separation system, the method comprising:
    flowing feed air into an air separation manifold comprising:
        a plurality of individual air separation modules, each individual the air separation module of the plurality comprising:
            an inlet header configured to receive feed air, wherein the inlet header is an empty space located in a first side of the air separation module;

an air separation membrane configured to receive the feed air from the inlet header, the air separation membrane configured to separate the feed air into nitrogen-enriched air and oxygen-enriched air;

an outlet header configured to receive the nitrogen enriched air from the air separation membrane, wherein the outlet header is an empty space located in a second side of the air separation module opposite the first side of the air separation module; and an oxygen sensor located in the outlet header of that individual air separation module;

separating the feed air into nitrogen-enriched air and oxygen-enriched air in the plurality of air separation modules;

flowing the nitrogen-enriched air through the plurality oxygen sensors located in the plurality of outlet headers of the plurality of air separation modules; and sensing a concentration of oxygen in the nitrogen-enriched air produced by the plurality of individual air separation membranes with the plurality of oxygen sensors.

9. The method of claim 8, and further comprising transporting the nitrogen-enriched air from the air separation module to a fuel tank of an aircraft for inerting.

10. The method of claim 8, and further comprising rejecting the oxygen-enriched air overboard the aircraft.

11. The method of claim 8, wherein separating the feed air into nitrogen-enriched air and oxygen-enriched air includes flowing the feed air through a membrane of the air separation module.

* * * * *